United States Patent [19]

Schofield et al.

[11] Patent Number: 4,797,440

[45] Date of Patent: Jan. 10, 1989

[54] DISPERSED PARTICULATE COMPOSITION

[75] Inventors: John D. Schofield, Bury; Roger Slater, Saddleworth, both of England

[73] Assignee: Imperial Chemical Industries PLC, London, England

[21] Appl. No.: 66,236

[22] Filed: Jun. 25, 1987

[30] Foreign Application Priority Data

Jul. 16, 1986 [GB] United Kingdom ................. 8617186

[51] Int. Cl.$^4$ .......................... C08K 5/16; C08K 5/10; C08K 5/09

[52] U.S. Cl. .................................. 524/239; 524/240; 524/286; 524/295; 524/306; 524/311; 524/394; 524/396; 524/397; 524/400

[58] Field of Search ............... 524/295, 306, 311, 285, 524/286, 239, 240, 394, 396, 397, 400

[56] References Cited

U.S. PATENT DOCUMENTS 3,875,069 4/1975 Worschech et al. ................. 524/306
3,975,326 8/1976 de Vrieze .............................. 524/400
4,366,280 12/1982 Yukawa ................................ 524/397

Primary Examiner—Lewis T. Jacobs
Attorney, Agent, or Firm—Cushman, Darby & Cushman

[57] ABSTRACT

A composition comprising a dispersion of a finely divided particulate solid in a thermoplastic polymeric organic medium in the presence of a lubricant and a processing additive in which the processing additive comprises an organic compound containing at least one group of the formula:

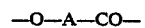

wherein A is a divalent aliphatic radical containing 17 carbon atoms, at least 4 of which are directly between the oxygen atom and the carbonyl group.

The composition is suitable for blending a particulate solid into a polymer.

7 Claims, No Drawings

DISPERSED PARTICULATE COMPOSITION

This specification describes an invention relating to a composition comprising a dispersion of a finely divided particulate solid, a processing additive and a lubricant in a thermoplastic polymeric organic medium.

THE COMPOSITION

According to the present invention there is provided a composition comprising a dispersion of a finely divided particulate solid in a thermoplastic polymeric organic medium in the presence of a lubricant and a processing additive, comprising an organic compound containing and at least one group of the formula:

    I wherein A is a divalent aliphatic radical containing 17 carbon atoms, at least 4 of which are directly between the oxygen atom and the carbonyl group.

It is preferred that the mean diameter of the particles of the solid is below 100 microns, more preferably below 25 microns and especially below 10 microns. The composition, which should be solid at ambient temperature, preferably exhibits Bingham Plastic rheology under the processing conditions in which the composition is prepared or subsequently shaped.

The composition preferably contains from 0.1% to 90%, more preferably from 0.5% to 70%, by weight of the finely divided particulate solid, from 0.5% to 25%, more preferably from 1% to 10%, by weight of processing additive, based on weight of particulate solid, and from 0.1% to 20%, more preferably from 0.25% to 5%, by weight of lubricant, based on total weight of the composition. A composition containing a relatively small amount of particulate solid is commonly referred to as "compound", and the process by which it is manufactured as "compounding". A composition containing a relatively large amount of particulate solid is commonly referred to as a "masterbatch", and the process by which it is manufactured as "masterbatching".

The composition can be prepared by mixing the ingredients together in the desired proportions and subjecting them to any of the processes commonly used for dispersing particulate solids in thermoplastic polymer. Types of equipment commonly used for this dispersion process include extruders, injection moulders, internal mixers, including Banbury mixers, Z-blade and sigma-blade mixers, and twin-roll mills. It is preferred to mix the processing additive thoroughly with the thermoplastic polymeric material in powder or granular form before addition, and mixing in, of the particulate solid and lubricant.

The composition may include other ingredients such as anti-oxidants, anti-static agents, coupling agents, foaming agents, mould release agents, plasticisers, slip agents, UV stabilisers and viscosity depressants.

The composition is particularly suitable for use in the manufacture of coloured plastic films, fibres and other shaped articles. Such compositions are often referred to as "compound" or "masterbatches" the latter being used for introducing pigments, fillers and extenders into bulk polymeric materials prior to their moulding or extrusion into shaped articles.

Advantages of compositions in accordance with the invention include a finer state of dispersion manifested by the presence of fewer aggregates or specks, higher tinctorial strengths, improved brightness, faster rates of dispersion in, for example, extrusion type dispersing equipment, better surface finish, reduced strand breakage in fibre manufacture, and higher particulate solids content for a given viscosity. Another advantage is the faster and more efficient processing in extrusion type equipment on account of reduced screw slippage.

THE SOLID

The solid may be any pigment, extender or filler which it is desired to distribute and stabilise in a finely divided state in a thermoplastic polymeric organic medium.

A preferred solid is a pigment from any of the recognised classes of pigments described, for example, in the Third Edition of the Colours Index (1971) and subsequent revisions of, and supplements thereto, under the chapter headed "Pigments".

Examples of inorganic pigments are titanium dioxide, zinc oxide, Prussian blue, cadmium sulphide, iron oxides, vermillion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scalret and red chromes.

Examples of organic pigments are those from the azo, disazo, condensed azo, thioindigo, indanthrone, isoindanthrone, anthanthrone, isoindoline, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanines, monoazos, disazos, condensed azos, indanthrones, anthranthrones, quinacridones and carbon blacks.

Examples of extenders and fillers are talc, kaolin, silica, calcium carbonate, barytes and chalk.

THE LUBRICANT

The lubricant may be any organic material having lubrication properties in polymer processing. The characteristics of suitable lubricants are described by N.C. van Vonno in "Modern Plastics Encyclopedia 1978-1979" page 208, published by McGraw-Hill International. Preferred lubricants are those referred to by van Vonno in this article, and those referred to in an article entitled "Additive Lubricants" in "Modern Plastics International" October 1984, pages 58-59, published by McGraw-Hill Publications Overseas Corp. of Lausanne, Switzerland.

Examples of suitable lubricants are long-chain, preferably $C_{8-25}$, fatty acids and fatty acid salts such as metallic stearates, especially magnesium, zinc, calcium, lead, lithium, sodium, barium and cadmium stearates, long-chain fatty acid esters, fatty acid amides, especially stearamide, oleamide and behenamide, paraffin and microcrystalline waxes, polyethylene waxes, including oxidised polyethylene waxes, mineral oils and silicone oils.

THE PROCESSING ADDITIVE

It is preferred that the processing additive (hereinafter called the "Additive") contains from 1 to 6 and more preferably from 1 to 3 groups of Formula I. A preferred Additive is represented by the formula:

wherein
A is as hereinbefore defined;
J is H, a metal, NH₄ or substituted ammonium;
T is optionally substituted alkyl, alkenyl, cycloalkyl, polycycloalkyl, aryl or polyaryl; and
n is an integer between 1 and 6, preferably from 1 to 3.

The precise structure of the chain terminating group T, is not critical provided it is inert to the other components of the composition under the normal processing conditions to which it is subjected. It is preferably free from ionic and strongly polar groups and preferably has a molecular weight of less than 300 and contains only C and H or C, H and O atoms.

Where the Additive is prepared by the polyesterification of a hydroxyalkyl or hydroxyalkenyl carboxylic acid, HO—A—COOH, the terminating group, T, may be HO—A— or H—A— derivable from the acids themselves or from the non-hydroxyl analogues which are generally present in commercial grades of such acids. However, T may be derived from any convenient acid added to the polyesterification reaction mixture, such as acetic acid, phenylacetic acid, lauric acid, benzoic acid, abietic acid etc as hereinafter described.

The group, T, is preferably alkyl or alkenyl containing up to 35 carbon atoms, especially from 7 to 25, and more especially from 7 to 20, carbon atoms, such as heptyl, octyl, undecyl, lauryl, heptadecyl, heptadecenyl, heptadecadienyl, stearyl, oleyl, linoleyl or such a group substituted by a hydroxy, halo or alkoxy group, especially $C_{1-4}$-alkoxy, such as 12-hydroxystearyl and 12-hydroxyoleyl. Other values for T include, $C_{4-8}$-cycloalkyl, such as cyclohexyl; polycycloalkyls, for example, polycyclic terpenyl groups which are derivable from naturally occurring acids such as abietic acid; aryl such as phenyl; aralkyl, such as benzyl, and polyaryl, such as naphthyl, biphenyl, stilbenyl and, phenylmethylphenyl. Such groups are preferably unsubstituted or substituted by a group selected from hydroxy, halo and $C_{1-4}$-alkoxy.

The divalent aliphatic radical, A, preferably contains from 8 to 14 carbon atoms directly between the oxygen atom and the carbonyl group. It is especially preferred that A is an alkylene or an alkenylene group, such as:

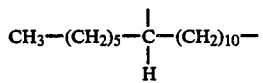

or

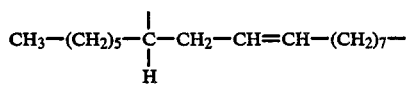

Where J is a metal, preferred metals are alkali metals, especially sodium, potassium, and alkaline earth metals, especially calcium. Where J is a substituted ammonium group, preferred groups are those derived from alkylamines, such as octadecylamine, diethylamine and triethylamine; arylamines, such as aniline and toluidine; and di- and poly-amines such as ethylenediamine, diethylenetriamine and triethylenetetramine.

Where the optional substituent on the terminating group, T, is hydroxy, the Additive may be prepared by polymerising a hydroxycarboxylic acid, optionally followed by neutralising with an appropriate base. Where T is unsubstituted, or carries a different substituent, the polymerisation may be modified by the inclusion of a chain terminating carboxylic acid of the formula:

The polymerisation may be performed by heating a suitable hydroxycarboxylic acid, optionally in the presence of a suitable chain terminating agent such as a non-hydroxyl substituted carboxylic acid, preferably in the presence of an esterification catalyst, such as tetrabutyl titanate, zirconium naphthenate, zinc acetate or toluene sulphonic acid, at a temperature from 150° C. to 250° C. The water formed in the esterification reaction is preferably removed from the reaction medium, and this can be conveniently done by passing a stream of nitrogen over the reaction mixture, or by carrying out the reaction in the presence of a solvent such as toluene or xylene, and distilling off the water as it is formed.

Where the Additive is in the form of a metal salt it can be conveniently made by heating the product from the esterification reaction with an oxide, hydroxide or carbonate of the metal at a convenient temperature, for example between 150° C. and 250° C. Where the Additive is an ammonium salt it can be conveniently made by heating the product from the esterification reaction with the appropriate amine at a convenient temperature, for example just above the melting point of the esterification reaction product. Such salts may also be made in situ during the grinding operation.

THE POLYMERIC MEDIUM

The polymeric medium may be any thermoplastic polymer used to manufacture films, fibres and solid articles.

Examples of suitable thermoplastic polymers are polyethylene, including low density, linear low density and high density polyethylene, polypropylene, polystyrene, polyethylene terephthalate, polybutylene terephthalate, nylon 6, nylon 66, nylon 46, polymethylmethacrylate, polyethersulphone, polyether ether ketone, polycarbonate and polyvinyl chloride, co-polymers including polyethylene vinyl acetate, terpolymers including polyacrylonitrilebutadiene-styrene, polymer blends and polymer alloys.

The invention is further illustrated by the following examples in which all parts and percentages are by weight unless otherwise indicated.

ADDITIVE 1

A mixture of 1000 g of commercial grade 12-hydroxy stearic acid (HSA) and 1 g of tetrabutyl titanate was stirred under nitrogen for 16 hours at 170° C. to 180° C. The product was a viscous liquid with an acid value of 34 mg KOH/g. It therefore had a molecular weight of 1650 and the average value of n was 4.5.

ADDITIVE 2

A mixture of 100 g of stearic acid, 335 g of commercial grade 12-hydroxy stearic acid (HSA) and 0.9 g of tetrabutyl titanate was stirred under nitrogen at 170° C. to 180° C. for approximately 16 hours, when it had an acid value of 73 mg KOH/g. The product was a light brown and partly solidified at room temperature. It had a molecular weight of 768 and the average value of n was 1.6.

ADDITIVES 3 TO 5

Table 1 lists a series of preparations carried out in the same manner as described for Additive 2, but using the quantities of stearic acid (SA) and 12-hydroxy-stearic acid (HSA) indicated in Table 1 in place of the commercial grade HSA. The Additives had the properties given in Table 1.

TABLE 1

| Additive No | Weight SA | Weight HSA | Acid Value (mg KOH/g) | Mol. Wt | Average value of n |
|---|---|---|---|---|---|
| 3 | 112 | 150 | 94.4 | 594 | 1.0 |
| 4 | 45 | 150 | 66.7 | 841 | 1.8 |
| 5 | 25 | 150 | 48.9 | 1147 | 2.87 |

ADDITIVE 6

A mixture of 100 g of ricinoleic acid (NOUR Acid CS 80 from AKZO:NOUR is a trade mark), 43 g of oleic acid, and 0.3 g of tetrabutyl titanate was stirred under nitrogen at 170°–180° C. for approximately 16 hours, when it had an acid value of 76.7 mg KOH/g. The product was a light brown liquid with a molecular weight of 731, and the average value of n was 1.6.

ADDITIVE 7

A mixture of 10 g (0.0137 mols) of Additive 7 and 2.04 g (0.0137 mols) of triethanolamine was heated to approximately 100° C. and then allowed to cool to room temperature.

ADDITIVE 8

A mixture of 300 g of commercial grade 12-hydroxystearic acid, 85 g of oleic acid and 0.8 g of tetrabutyl titanate was stirred under nitrogen at 170°–190° C. for approximately 10 hours, when it had an acid value of 73 mg.KOH/g. The product was a light brown liquid with a molecular weight of 768, and the average value of n was 1.7.

EXAMPLES 1 TO 7 AND COMPARATIVE EXAMPLES 1A TO 7A

The dispersions having the formulations described in Table 2 were prepared by the following process. Such dispersions are commonly referred to in the polymer formulation art as "compound".

The thermoplastic polymer in granular or powder form was charged to a high speed mixer (Henschel Type FM 10). The processing additive (if present in the composition) was added, and distributed evenly throughout the composition by mixing for an appropriate length of time, typically approximately one minute. Particulate solid and lubricant were then added, and similarly distributed evenly throughout the composition by mixing for an appropriate length of time, again typically approximately one minute. In the following tables Example relate to compositions falling within the scope of the present invention and Comparative Examples (Comp Ex) relate to compositions falling outside the scope of the present invention. Where the particulate solid is a pigment it is identified by its Colour Index No, e.g. Blue 15.2 is CI Pigment Blue 15.2. The following abbreviations are also used LDPE 1: is low density polyethylene granules (Grade 27 from BP Ltd)
LDPE 2: is low density polyethylene powder (Grade 19/04/00A from ICI)
PP: is polypropylene powder (521E from ICI)
ABS gran: is acrylonitrile-butadiene-styrene terpolymer (Lustran QE 1088 from Monsanto)
ABS powd: is acrylonitrile-butadiene-styrene terpolymer (Cycolac T from Borg Warner)
PS: is crushed polystyrene (Lacqrene 1811 from Atochem)
PVC: is polyvinyl chloride poweder (Corvic S62/109 from ICI)
ZnSt: is zinc stearate
CaSt: is calcium stearate
HxSt: is hexadecyl stearate
StAm: is stearamide
PE Wax: is polyethylene wax (AC6 powder from Allied Chemicals)
M Oil: is mineral oil
Add: is Additive

TABLE 2

| Example/ Comp Ex | Thermoplastic Polymer (Amt) | Particulate Solid(s) (Amt) | Lubricant (amount) | Additive (amount) |
|---|---|---|---|---|
| 1 | LDPE 1 (100 g) | Blue 15.2 (0.5 g) White 6 (0.5 g) | ZnSt (0.3 g) | Add 2 (0.05 g) |
| 1A | LDPE 1 (100 g) | Blue 15.2 (0.5 g) White 6 (0.5 g) | ZnSt (0.3 g) | — |
| 2 | LDPE 1 (100 g) | Green 7 (0.5 g) White 6 (0.5 g) | ZnSt (0.3 g) | Add 2 (0.05 g) |
| 2A | LDPE 1 (100 g) | Green 7 (0.5 g) White 6 (0.5 g) | ZnSt (0.3 g) | — |
| 3 | LDPE 1 (100 g) | White 6 (2.0 g) | ZnSt (0.3 g) | Add 2 (0.1 g) |
| 3A | LDPE 1 (100 g) | White 6 (2.0 g) | ZnSt (0.3 g) | — |
| 4 | PP (100 g) | Violet 19 (0.5 g) White 6 (0.5 g) | ZnSt (0.3 g) | Add 2 (0.05 g) |
| 4A | PP (100 g) | Violet 19 (0.5 g) White 6 (0.5 g) | ZnSt (0.3 g) | — |
| 5 | ABS gran (100 g) | Green 36 (0.5 g) White 6 (2.0 g) | CaSt (0.3 g) | Add 2 (0.3 g) |
| 5A | ABS gran 100 g | Green 36 (0.5 g) White 6 (2.0 g) | CaSt (0.3 g) | — |
| 6 | ABS powd (100 g) | Green 7 (0.2 g) White 6 (2.0 g) | CaSt (0.3 g) | Add 2 (0.11 g) |
| 6A | ABS powd (100 g) | Green 7 (0.2 g) White 6 (2.0 g) | CaSt (0.3 g) | — |
| 7 | ABS powd (100 g) | Blue 15.1 (0.2 g) White 6 (2.0 g) | CaSt (0.3 g) | Add 2 (0.11 g) |
| 7A | ABS powd (100 g) | Blue 15.1 (0.2 g) White 6 | CaSt (0.3 g) | — |

TABLE 2-continued

| Example/ Comp Ex | Thermoplastic Polymer (Amt) | Particulate Solid(s) (Amt) | Lubricant (amount) | Additive (amount) |
|---|---|---|---|---|
| | | (2.0 g) | | |

Each composition was extruded in ribbon form through a die of dimensions 100 mm by 0.62 mm using a Betol Model 2530 with a screw diameter of 25 mm and L/D ratio of 30/1. The extruder barrel had four independently controlled heated zones and a heated die. The temperatures at which the extrusion processes were carried out depended on the type and grade of thermoplastic polymer used in the composition and are given in Table 3.

TABLE 3

| | Temperature (°C.) | | | | |
|---|---|---|---|---|---|
| Polymer | Zone 1 | Zone 2 | Zone 3 | Zone 4 | Die |
| LDPE 1 | 120 | 140 | 150 | 160 | 180 |
| LDPE 2 | 120 | 140 | 150 | 160 | 180 |
| PP | 185 | 195 | 205 | 210 | 220 |
| ABS gran | 190 | 196 | 210 | 220 | 235 |
| ABS powd | 190 | 196 | 210 | 220 | 235 |
| PS | 180 | 190 | 200 | 210 | 220 |

In each Example and Comparative Example the extruded ribbon of film was assessed for speckiness and/or the colour strength of each Example was compared visually with the colour strength of the appropriate Additive-free Comparative Example. The results are reported in Table 4.

TABLE 4

| Example/ Comp Ex | Speckiness | Colour Strength |
|---|---|---|
| 1 | Speck-free | Stronger than Comp Ex 1A. |
| 1A | Speck-free | |
| 2 | Speck-free | Stronger than Comp Ex 2A. |
| 2A | Specky | |
| 3 | Speck-free | Not applicable to white film. |
| 3A | Specky | |
| 4 | Speck-free | Stronger than Comp Ex 4A. |
| 4A | Slightly specky | |
| 5 | Speck-free | Stronger than Comp Ex 5A. |
| 5A | Speck free | |
| 6 | — | Stronger than Comp Ex 6A. |
| 6A | — | |
| 7 | — | Stronger than Comp Ex 7A. |
| 7A | — | |

EXAMPLES 8 TO 13 AND COMPARATIVE EXAMPLES 8A TO 13A

The dispersions having the formulations described in Table 5 were prepared by the same process as Examples 1 to 7 and Comp Ex 1A to 7A except that:

(i) In the case of Examples 8 and 9 and Comp Ex 8A and 9A the initial mixing processes were carried out in a high speed food mixer (Kenwood) with a mixing time of about 1 minute.

(ii) In the case of Examples 10 to 13 and Comp Ex 10A to 13A the initial mixing processes were carried out by tumbling the components in a glass jar rotating along a horizontal axis with a mixing time of about 30 minutes.

TABLE 5

| Example/ Comp Ex | Thermoplastic Polymer (Amt) | Particulate Solid(s) (Amt) | Lubricant (amount) | Additive (amount) |
|---|---|---|---|---|
| 8 | PS (100 g) | Violet 19 (0.2 g) White 6 (2.0 g) | ZnSt (0.3 g) | Add 2 (0.11 g) |
| 8A | PS (100 g) | Violet 19 (0.2 g) White 6 (2.0 g) | ZnSt (0.3 g) | — |
| 9 | PS (100 g) | Green 7 (0.2 g) White 6 (2.0 g) | ZnSt (0.3 g) | Add 2 (0.11 g) |
| 9A | PS (100 g) | Green 7 (0.2 g) White 6 (2.0 g) | ZnSt (0.3 g) | — |
| 10 | ABS gran (100 g) | Green 7 (0.2 g) White 6 (2.0 g) | CaSt (0.3 g) | Add 2 (0.11 g) |
| 10A | ABS gran (100 g) | Green 7 (0.2 g) White 6 (2.0 g) | CaSt (0.3 g) | — |
| 11 | ABS gran (100 g) | Yellow 180 (0.2 g) White 6 (2.0 g) | CaSt (0.3 g) | Add 2 (0.11 g) |
| 11A | ABS gran (100 g) | Yellow 180 (0.2 g) White 6 (2.0 g) | CaSt (0.3 g) | — |
| 12 | ABS gran (100 g) | Red 122 (0.2 g) White 6 (2.0 g) | CaSt (0.3 g) | Add 2 (0.11 g) |
| 12A | ABS gran (100 g) | Red 122 (0.2 g) White 6 (2.0 g) | CaSt (0.3 g) | — |
| 13 | ABS gran (100 g) | Red 214 (0.2 g) White 6 (2.0 g) | CaSt (0.3 g) | Add 2 (0.11 g) |
| 13A | ABS gran (100 g) | Red 214 (0.2 g) White 6 (2.0 g) | CaSt (0.3 g) | — |

Each composition was then extruded as described for Examples 1 to 7 and Comparative Examples 1A to 7A. The colour strength of each Example was compared visually and/or using a Macbeth MS 2020 spectrophotometer (supplied by Kollmorgen Corp. of USA) with the colour strength of the appropriate Additive-free Comparative Example. The results are reported in Table 6.

TABLE 6

| Example/ Comp Ex | Colour Strength |
|---|---|
| 8 | Stronger than Comp Ex 8A. |
| 8A | |
| 9 | Stronger than Comp Ex 9A. |
| 9A | |
| 10 | Stronger than Comp Ex 10A. |
| 10A | |
| 11 | Stronger than Comp Ex 11A. |
| 11A | |
| 12 | Stronger than Comp Ex 12A. |
| 12A | |
| 13 | Stronger than Comp Ex 13A. |
| 13A | |

EXAMPLES 14 TO 36 AND COMPARATIVE EXAMPLES 14A TO 36A

The dispersions having the formulations described in Table 7 were prepared by the processes described for Examples 1 to 13 and Comparative Examples 1A to 13A. The initial mixing process used is indicated for each Example or Comparative Example in Table 7 by the following letter codes.

H: Henschel high speed mixer; K: Kenwood mixer; T: Tumbled

TABLE 7

| Example/Comp Ex | | Thermoplastic Polymer (Amt) | Particulate Solid(s) (Amt) | Lubricant (amount) | Additive (amount) |
|---|---|---|---|---|---|
| 14 | H | LDPE 2 (80 g) | Red 48.2 (3.5 g) White 6 (16.5 g) | ZnSt (0.3 g) | Add 2 (1.0 g) |
| 14A | H | LDPE 2 | Red 48.2 (3.5 g) | ZnSt | — |

TABLE 7-continued

| Example/Comp Ex | Thermoplastic Polymer (Amt) | Particulate Solid(s) (Amt) | Lubricant (amount) | Additive (amount) |
|---|---|---|---|---|
| 15 | H LDPE 2 (80 g) | Red 101 (3.5 g) White 6 (16.5 g) | ZnSt (0.3 g) | Add 2 (1.0 g) |
| 15A | H LDPE 2 (80 g) | Red 101 (3.5 g) White 6 (16.5 g) | ZnSt (0.3 g) | — |
| 16 | K PP (100 g) | Yellow 83 (3.5 g) White 6 (16.5 g) | ZnSt (0.3 g) | Add 2 (1.0 g) |
| 16A | K PP (100 g) | Yellow 83 (3.5 g) White 6 (16.5 g) | ZnSt (0.3 g) | — |
| 17 | K PP (100 g) | Red 214 (3.5 g) White 6 (16.5 g) | ZnSt (0.3 g) | Add 2 (1.0 g) |
| 17A | K PP (100 g) | Red 214 (3.5 g) White 6 (16.5 g) | ZnSt (0.3 g) | — |
| 18 | T LDPE 2 (34 g) | Black 7 (40 g) CaCO3 (17 g) CaO (3.0 g) | PE Wax (3.0 g) M Oil (1.5 g) | Add 2 (1.5 g) |
| 18A | T LDPE 2 (34 g) | Black 7 (40 g) CaCO3 (17 g) CaO (3.0 g) | PE Wax (3.0 g) M Oil (3.0 g) | — |
| 19 | H LDPE 2 (100 g) | Yellow 34 (50 g) | ZnSt (0.3 g) | Add 2 (2.5 g) |
| 19A | H LDPE 2 (100 g) | Yellow 34 (50 g) | ZnSt (0.3 g) | — |
| 20 | H LDPE 2 (100 g) | Blue 15.1 (20 g) | ZnSt (0.3 g) | Add 2 (1.0 g) |
| 20A | H LDPE 2 (100 g) | Blue 15.1 (20 g) | ZnSt (0.3 g) | — |
| 21 | H PP (100 g) | CaCO3 (20 g) | ZnSt (0.3 g) | Add 2 (1.0 g) |
| 21A | H PP (100 g) | CaCO3 (20 g) | ZnSt (0.3 g) | — |
| 22 | H ABS pow (100 g) | CaCO3 (20 g) | CaSt (0.3 g) | Add 2 (1.0 g) |
| 22A | H ABS pow (100 g) | CaCO3 (20 g) | CaSt (0.3 g) | — |
| 23 | K ABS gran (100 g) | Green 36 (0.2 g) White 6 (2.0 g) | CaSt (0.3 g) | Add 3 (0.11 g) |
| 23A | K ABS gran (100 g) | Green 36 (0.2 g) White 6 (2.0 g) | CaSt (0.3 g) | — |
| 24 | K ABS gran (100 g) | Green 36 (0.2 g) White 6 (2.0 g) | CaSt (0.3 g) | Add 4 (0.11 g) |
| 25 | K ABS gran (100 g) | Green 36 (0.2 g) White 6 (2.0 g) | CaSt (0.3 g) | Add 5 (0.11 g) |
| 26 | K ABS gran (100 g) | Green 36 (0.2 g) White 6 (2.0 g) | CaSt (0.3 g) | Add 6 (0.11 g) |
| 27 | K ABS gran (100 g) | Green 36 (0.2 g) White 6 (2.0 g) | CaSt (0.3 g) | Add 7 (0.11 g) |
| 28 | K ABS gran (100 g) | Green 36 (0.2 g) White 6 (2.0 g) | CaSt (0.3 g) | Add 8 (0.11 g) |
| 29 | K ABS gran (100 g) | Green 36 (0.2 g) White 6 (2.0 g) | CaSt (0.3 g) | Add 2 (0.04 g) |
| 30 | K ABS gran (100 g) | Green 36 (0.2 g) White 6 (2.0 g) | CaSt (0.3 g) | Add 2 (0.44 g) |
| 31 | K ABS gran (100 g) | Green 36 (0.2 g) White 6 (2.0 g) | CaSt (0.3 g) | Add 2 (0.11 g) |
| 32 | K ABS gran (100 g) | Green 36 (0.2 g) White 6 (2.0 g) | CaSt (0.66 g) | Add 2 (0.11 g) |
| 33 | K LDPE 2 (100 g) | Green 36 (0.2 g) White 6 (2.0 g) | HxSt (0.3 g) | Add 2 (0.11 g) |
| 33A | K LDPE 2 (100 g) | Green 36 (0.2 g) White 6 (2.0 g) | HxSt (0.3 g) | — |
| 34 | K LDPE 2 (100 g) | Green 36 (0.2 g) White 6 (2.0 g) | StAm (0.3 g) | Add 2 (0.11 g) |
| 34A | K LDPE 2 (100 g) | Green 36 (0.2 g) White 6 (2.0 g) | StAm (0.3 g) | — |
| 35 | K LDPE 2 (100 g) | Green 36 (0.2 g) White 6 (2.0 g) | PE Wax (0.3 g) | Add 2 (0.11 g) |
| 35A | K LDPE 2 (100 g) | Green 36 (0.2 g) White 6 (2.0 g) | PE Wax (0.3 g) | — |
| 36 | T LDPE 2 (34 g) | Black 7 (40 g) CaCO3 (17 g) CaO (3.0 g) | PE Wax (3.0 g) M Oil (1.5 g) | Add 1 (1.5 g) |
| 36A | T LDPE 2 (34 g) | Black 7 (40 g) CaCO3 (17 g) CaO (3.0 g) | PE Wax (3.0 g) M Oil (3.0 g) | — |

Each composition was then extruded in ribbon form as described for Examples 1 to 13 and Comparative Examples 1A to 13A. The temperatures of extrusion were those given in Table 3.

In the case of Examples 14 to 17, and 21 to 36, and Comparative Examples 14A to 17A, and 21A to 36A, which contained either CI Pigment White 6 (an opaque pigment) or CaCO3 (an opaque filler), the extruded film was assessed directly for speckiness and/or colour strength as considered appropriate. In the case of Examples 18 and 20 and Comparative Examples 18A and 20A, which were Masterbatches prepared for their high tinting strength, a further dilution and extrusion was necessary to give a meaningful assessment of dispersion quality. Each composition was therefore extruded through a 2.5 mm diameter die, chopped into approximately 5 mm length pieces and mixed by tumbling at a 1.5% loading by weight with (i) uncoloured granules of the same polymer, and (ii) granules of the same polymer containing 30% Pigment White 6. These mixtures were then extruded into a ribbon form, as before, and the films assessed for speckiness and/or colour strength, as considered appropriate. In the case of Example 19 and Comparative Example 19A extrusion and chopping to form 5 mm by 2.5 mm diameter granules was also carried out. These granules were then mixed by tumbling with an approximately equal weight of the same polymer containing 60% Pigment White 6. These mixtures were then extruded into a ribbon form, as before, and the films assessed for relative colour strength. The results are reported in Table 8.

TABLE 8

| Example/Comp Ex | Speckiness | Colour Strength |
|---|---|---|
| 14 | — | Stronger than Comp Ex 14A. |
| 14A | — | |
| 15 | — | Stronger than Comp Ex 15A. |
| 15A | — | |
| 16 | — | Stronger than Comp Ex 16A. |
| 16A | — | |
| 17 | — | Stronger than Comp Ex 17A. |
| 17A | — | |
| 18 | Very specky | Stronger than Comp Ex 18A. |
| 18A | Speck free | |
| 19 | — | Stronger than Comp Ex 19A. |
| 19A | — | |
| 20 | Speck free | Stronger than Comp Ex 20A |
| 20A | Speck free | |
| 21 | Specky | |
| 21A | Very specky | |
| 22 | Speck free | — |
| 22A | Slightly specky | |
| 23 | Speck free | Stronger than Comp Ex 23A |
| 23A | Slightly specky | |
| 24 | Speck free | Stronger than Comp Ex 23A |
| 25 | Speck free | Stronger than Comp Ex 23A |
| 26 | Speck free | Stronger than Comp Ex 23A |
| 27 | Speck free | Stronger than Comp Ex 23A |
| 28 | Speck free | Stronger than Comp Ex 23A |
| 29 | Speck free | Stronger than Comp Ex 23A |
| 30 | Slightly | Stronger than Comp Ex 23A |

TABLE 8-continued

| Example/ Comp Ex | Speckiness | Colour Strength |
|---|---|---|
| | specky | |
| 31 | Speck free | Stronger than Comp Ex 23A |
| 32 | Speck free | Stronger than Comp Ex 23A |
| 33 | — | Slightly stronger than Comp Ex 33A. |
| 33A | — | |
| 34 | — | Stronger than Comp Ex 34A. |
| 34A | — | |
| 35 | — | Slightly stronger than Comp Ex 35A. |
| 35A | — | |
| 36 | Slightly specky | Stronger than Comp Ex 36A. |
| 36A | Very specky | |

EXAMPLE 37 AND COMPARATIVE EXAMPLE 37A

The dispersions having the formulations described in Table 9 were prepared by the following process. Such dispersions are commonly referred to in the polymer formulation art as "compound".

The components were mixed by the technique described for Examples 1 to 7 and Comparative Examples 1A to 7A. The composition was then subjected to a twin-roll milling process to give a dispersion of particulate solid in polymer. The twin-roll mill used had rollers of approximately 22.5 cm length and 10 cm diameter, and was supplied by Bridges of Rochdale, England.

TABLE 9

| Example/ Comp Ex | Thermoplastic Polymer (Amt) | Particulate Solid(s) (Amt) | Lubricant (amount) | Additive (amount) |
|---|---|---|---|---|
| 37 | PVC (100 g) | Blue 15.2 (0.2 g) White 6 (2.0 g) | CaSt (0.3 g) ZnSt (0.05 g) | Add 2 (0.11 g) |
| 37A | PVC (100 g) | Blue 15.2 (0.2 g) White 6 (2.0 g) | CaSt (0.25 g) ZnSt (0.05 g) | — |

The sheets of compounds, commonly referred to as "hides", produced on the twin roll mill were then compression moulded. These mouldings were compared, and Example 37 was found to be stronger than Comparative Example 37A.

EXAMPLE 38 AND COMPARATIVE EXAMPLE 38A

The dispersions having the formulations described in Table 10 were prepared by the following process. Such dispersions are commonly referred to in the polymer formulation art as "masterbatch".

The components were mixed by the technique described for Examples 1 to 7 and Comparative Examples 1A to 7A. The composition was then dispersed in a Banbury internal mixer.

TABLE 9

| Example/ Comp Ex | Thermoplastic Polymer (Amt) | Particulate Solid(s) (Amt) | Lubricant (amount) | Additive (amount) |
|---|---|---|---|---|
| 38 | LDPE 1 (72.75 g) | Black 7 (25 g) | ZnSt (1 g) | Add 2 (1.25 g) |
| 38A | LDPE 1 (74 g) | Black 7 (25 g) | ZnSt (1 g) | — |

In order to assess Example 38 and Comparative Example 378A, which were masterbatches prepared for their high tinting strength a further dilution was necessary. This dilution process was carried out on the twin roll mill described in Example 37 and Comparative Example 37A. Appropriate amounts of Example 38 or Comparative Example 38A, LDPE 1 and granules of LDPE 1 containing 60% Pigment White 6 were chosen to give further mastermatches containing 0.3% carbon black and 25% Pigment White 6. These further masterbatches were then converted into a sheet form by compression moulding. The masterbatch prepared from Example 38 was found to be stronger than the masterbatch prepared from Comparative Example 38A.

We claim:

1. A composition comprising a dispersion of a finely divided particulate solid in a thermoplastic polymeric organic medium in the presence of a lubricant and a processing additive of the formula:

$$T-CO-(O-A-CO)_n-O^-J^+$$

wherein

A is a divalent aliphatic radical containing 17 carbon atoms, at least 4 of which are directly between the oxygen atom and the carbonyl group;

J is H, a metal, NH$_4$ or substituted ammonium;

T is selected from alkyl, alkenyl, cycloalkyl, polycycloalkyl, aryl, and polyaryl, each of which is unsubstituted or substituted by a group selected from hydroxy, halo and C$_{1-4}$-alkoxy; and n is an integer between 1 and 6.

2. A composition according to claim 1 wherein n is from 1 to 3.

3. A composition according to claim 1 wherein T is alkyl or hydroxyalkyl containing from 7 to 20 carbon atoms.

4. A composition according to claim 1 wherein J is selected from H, an alkali metal, an alkaline earth metal and NH$_4$.

5. A composition according to claim 1 wherein A is of the formula:

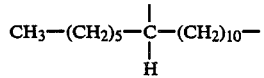

or

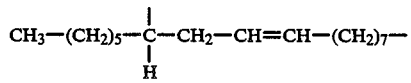

6. A composition according to any one of claims 1 or 2 to 6 wherein the solid is selected from pigments, extenders and fillers.

7. A composition according to any one of claims 1 or 2 to 5 wherein the lubricant is selected from stearic acid, metallic stearates, fatty acid ester and amides, paraffin and microcrystalline waxes, polyethylene and oxidised polyethylene waxes, silicone oils and mineral oils.

* * * * *

UNITED STATES PATENT AND TRADEMARK OFFICE
CERTIFICATE OF CORRECTION

PATENT NO. : 4,797,440

DATED : January 10, 1989

INVENTOR(S) : SCHOFIELD et al.

It is certified that error appears in the above-identified patent and that said Letters Patent is hereby corrected as shown below:

Title page:

Foreign Application Priority Data [30] "Jul. 16, 1986" should read --Jul. 15, 1986--.

Signed and Sealed this

Seventeenth Day of April, 1990

Attest:

HARRY F. MANBECK, JR.

*Attesting Officer*          *Commissioner of Patents and Trademarks*